US012604285B2

(12) United States Patent (10) Patent No.: US 12,604,285 B2
Zander et al. (45) Date of Patent: Apr. 14, 2026

(54) METHOD FOR HANDLING COMMUNICATION USING PARALLEL DATA STREAMS AND RELATED WIRELESS NODES AND WIRELESS DEVICES

(71) Applicant: Sony Group Corporation, Tokyo (JP)

(72) Inventors: Olof Zander, Södra Sandby (SE); Erik Bengtsson, Eslöv (SE); Fredrik Rusek, Eslöv (SE); Kun Zhao, Malmö (SE); José Flordelis, Lund (SE)

(73) Assignee: Sony Group Corporation, Tokyo (JP)

( * ) Notice: Subject to any disclaimer, the term of this patent is extended or adjusted under 35 U.S.C. 154(b) by 669 days.

(21) Appl. No.: 18/011,178

(22) PCT Filed: Jun. 16, 2021

(86) PCT No.: PCT/EP2021/066311
§ 371 (c)(1),
(2) Date: Dec. 18, 2022

(87) PCT Pub. No.: WO2022/008191
PCT Pub. Date: Jan. 13, 2022

(65) Prior Publication Data
US 2023/0217389 A1      Jul. 6, 2023

(30) Foreign Application Priority Data
Jul. 9, 2020    (SE) .................................... 2050869-3

(51) Int. Cl.
*H04W 56/00*      (2009.01)
*H04L 5/14*       (2006.01)

(52) U.S. Cl.
CPC ........... *H04W 56/0015* (2013.01); *H04L 5/14* (2013.01); *H04W 56/0045* (2013.01)

(58) Field of Classification Search
CPC .. H04W 56/0015; H04W 56/0045; H04L 5/14
See application file for complete search history.

(56) References Cited

U.S. PATENT DOCUMENTS

| | | | | |
|---|---|---|---|---|
| 6,094,421 A | | 7/2000 | Scott | |
| 6,549,567 B1 * | | 4/2003 | Fullerton | .............. H04L 5/1484 |
| | | | | 375/219 |

(Continued)

FOREIGN PATENT DOCUMENTS

| | | |
|---|---|---|
| CN | 109792703 A | 5/2019 |
| CN | 110178319 A | 8/2019 |

(Continued)

OTHER PUBLICATIONS

International Search Report and Written Opinion from corresponding International Application No. PCT/EP2021/066311, mailed on Nov. 15, 2021, 12 pages.

(Continued)

*Primary Examiner* — Bailor C Hsu
(74) *Attorney, Agent, or Firm* — Tucker Ellis LLP

(57) ABSTRACT

A method performed at a wireless device, for communicating with one or more wireless nodes using parallel data streams. The method includes determining, based on a first time of arrival of a first signal from a first wireless node and a second time of arrival of a second signal from a second wireless node, blanking required by the wireless device to ensure communication using the parallel data streams under current conditions. The method includes transmitting, to at least one of the first and second wireless nodes, signaling indicative of the determined required blanking.

20 Claims, 6 Drawing Sheets

S101 Determining blanking required by the wireless device to ensure communication using parallel data streams under current conditions

S101A

S103 Transmitting, to at least one of a first and a second wireless node, signaling indicative of the determined required blanking

S103A

(56) References Cited

U.S. PATENT DOCUMENTS

| | | | | |
|---|---|---|---|---|
| 9,474,080 | B2 * | 10/2016 | Negus | H04W 72/541 |
| 10,624,156 | B2 * | 4/2020 | Xiong | H04W 72/23 |
| 10,912,085 | B2 * | 2/2021 | Stirling-Gallacher | H04W 16/28 |
| 11,848,877 | B2 * | 12/2023 | Fehrenbach | H04W 72/23 |
| 2007/0286149 | A1 | 12/2007 | Yamamoto | |
| 2012/0257521 | A1 | 10/2012 | Mehta | |
| 2013/0136041 | A1 | 5/2013 | Hoymann | |
| 2017/0005741 | A1 | 1/2017 | Wu | |
| 2017/0367046 | A1 * | 12/2017 | Papasakellariou | H04W 72/23 |
| 2018/0069684 | A1 | 3/2018 | Ziren | |
| 2018/0219654 | A1 * | 8/2018 | Chen | H04L 5/16 |
| 2018/0343091 | A1 | 11/2018 | Xia | |
| 2019/0037640 | A1 | 1/2019 | Xiong | |
| 2019/0182818 | A1 | 6/2019 | Chen | |
| 2019/0191403 | A1 | 6/2019 | Goel | |
| 2023/0370895 | A1 * | 11/2023 | Mirza | H04W 72/1268 |

FOREIGN PATENT DOCUMENTS

| | | | |
|---|---|---|---|
| GB | 201701814 | | 3/2017 |
| JP | 2007336191 | A | 12/2007 |
| WO | 0195659 | A1 | 12/2001 |
| WO | 2013109049 | A1 | 7/2013 |
| WO | 2018120112 | A1 | 7/2018 |
| WO | 2019096072 | A1 | 5/2019 |

OTHER PUBLICATIONS

Office Action and Search Report from corresponding Swedish Application No. 2050869-3, dated Feb. 26, 2021, 11 pages.

* cited by examiner

100
S101 Determining blanking required by the wireless device to ensure communication using parallel data streams under current conditions
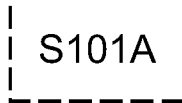
S101A
S103 Transmitting, to at least one of a first and a second wireless node, signaling indicative of the determined required blanking
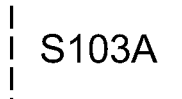
S103A
Fig. 3

S201 Obtaining signaling indicative of a blanking required by the wireless device to ensure communication using the parallel data streams under current conditions

S201A    S201B

S202 Determining the blanking required based on a time of reception of the data from the wireless device S203 Controlling, based on the obtained signaling indicative of the blanking required, a data stream communication to the wireless device

S203A    S203B

S205 Transmitting signaling indicative of a blanking required by the wireless device to a second wireless node of the plurality of wireless nodes communicating with the wireless device

METHOD FOR HANDLING COMMUNICATION USING PARALLEL DATA STREAMS AND RELATED WIRELESS NODES AND WIRELESS DEVICES

The present disclosure relates to a method for handling communication using parallel data streams, related wireless nodes and related wireless devices.

BACKGROUND

The $3^{rd}$ Generation Partnership Project, 3GPP, New Radio (NR) is in the process of commercialization. However, various aspects that require further enhancements can be identified from real deployment scenarios. An example of this is transmission using multiple Transmission Reception Point (TRP), which may also be referred to as multi-TRP transmission, as well as multi antenna panel reception at a wireless device. Multi-TRP may also include multi-TRP for inter-cell operations.

Two types of frequency ranges have been defined in 3GPP. A first frequency range referred to as FR1 comprises frequencies below 6 GHz while a second frequency range comprising millimeter wave (mmWave) range is referred to as FR2. For FR2 operation, Time Division Duplex (TDD), where Uplink (UL) and Downlink (DL) transmissions are separated in time, is used.

Besides the drawback of increased latency in TDD systems (compared to e.g. systems using Frequency Division Duplex (FDD)), TDD systems also require precise timing. UL and DL transmissions are transmitted in different time slots. In a multi-user wireless communications system, this requires a precise synchronization of all connected devices including network nodes, such as base stations (gNBs) and TRPs, in order to ensure that UL and DL transmissions to and/or from a wireless device or a wireless node are actually transmitted in different time slots.

However, when the number of wireless devices in the TDD system increases, a time synchronization of multiple network nodes, as seen from a perspective of the wireless device, becomes increasingly challenging both from a system complexity and implementation perspective.

SUMMARY

Accordingly, there is a need for devices (wireless nodes and wireless devices) and methods performed therein for enabling communication between a wireless device and one or more wireless nodes using parallel data streams, which mitigate, alleviate or address the shortcomings existing and provide a reduced latency and an improved utilization of available resources in a wireless communication system.

A method is disclosed, performed at a wireless device, for communicating with one or more wireless nodes using parallel data streams. The method comprises determining, based on a first time of arrival of a first signal from a first wireless node and a second time of arrival of a second signal from a second wireless node, blanking required by the wireless device to ensure communication using the parallel data streams under current conditions. The method comprises transmitting, to at least one of the one or more wireless nodes, signaling indicative of the determined required blanking.

Further, a wireless device is provided, the wireless device comprising memory circuitry, processor circuitry, and an interface. The wireless device is configured to determine, based on a first time of arrival of a first signal from a first wireless node and a second time of arrival of a second signal from a second wireless node, blanking required by the wireless device to ensure communication using parallel data streams under current conditions. The wireless device is configured to transmit, to at least one of the one or more wireless nodes, signaling indicative of the determined required blanking.

The disclosed wireless device and related method provide a solution for determining and reporting information indicative of required blanking for enabling communication using parallel data streams that are out of order based on current conditions of the wireless device. By reporting, to one or more wireless nodes, a blanking required by the wireless device under current conditions, the wireless communications system may individually optimize a configuration of the transmissions of the parallel data streams for the wireless device, based on the wireless device's individual capability to handle the parallel data streams. Unnecessary blanking in uplink and/or downlink can thereby be avoided. An advantage of this is that the latency in the wireless communication system may be reduced and the capacity of the wireless communications system may be increased.

The blanking may be dynamically adapted based on the reported information. Unnecessary blanking in uplink and/or downlink can thereby be avoided when the wireless device is communicating via parallel data streams.

Further, disclosed is a method, performed at a wireless node, for enabling a wireless device to communicate with one or more wireless nodes using parallel data streams. The method comprises obtaining signaling indicative of a blanking required by the wireless device to ensure communication using the parallel data streams under current conditions. The method comprises controlling, based on the obtained signaling indicative of the blanking required, a data stream communication to the wireless device.

Further, a wireless node is provided, the wireless node comprising memory circuitry, processor circuitry, and an interface. The wireless node is configured to obtain signaling indicative of a blanking required by the wireless device to ensure communication using the parallel data streams under current conditions. The wireless node is configured to control, based on the obtained signaling indicative of the blanking required, a data stream communication to the wireless device.

By signaling a blanking required by the wireless device to ensure communication using the parallel data streams under current conditions to one or more wireless nodes, the wireless communications system may individually optimize a configuration of the transmissions of the parallel data streams for each of the wireless devices in the wireless communications system based on their individual capability to handle the parallel data streams. Unnecessary blanking in uplink and/or downlink can thereby be avoided. An advantage of this is that the latency in the wireless communication system may be reduced and the capacity of the wireless communications system may be increased.

BRIEF DESCRIPTION OF THE DRAWINGS

The above and other features and advantages of the present disclosure will become readily apparent to those skilled in the art by the following detailed description of example embodiments thereof with reference to the attached drawings, in which:

FIG. 3 is a flow-chart illustrating an example method, performed in a wireless device, for communicating with one or more wireless nodes using parallel data streams according to this disclosure, FIG. 4 is a flow-chart illustrating an example method, performed in a wireless node of a wireless communication system, for enabling a wireless device to communicate with one or more wireless nodes using parallel data streams according to this disclosure.

DETAILED DESCRIPTION

Figure 1:
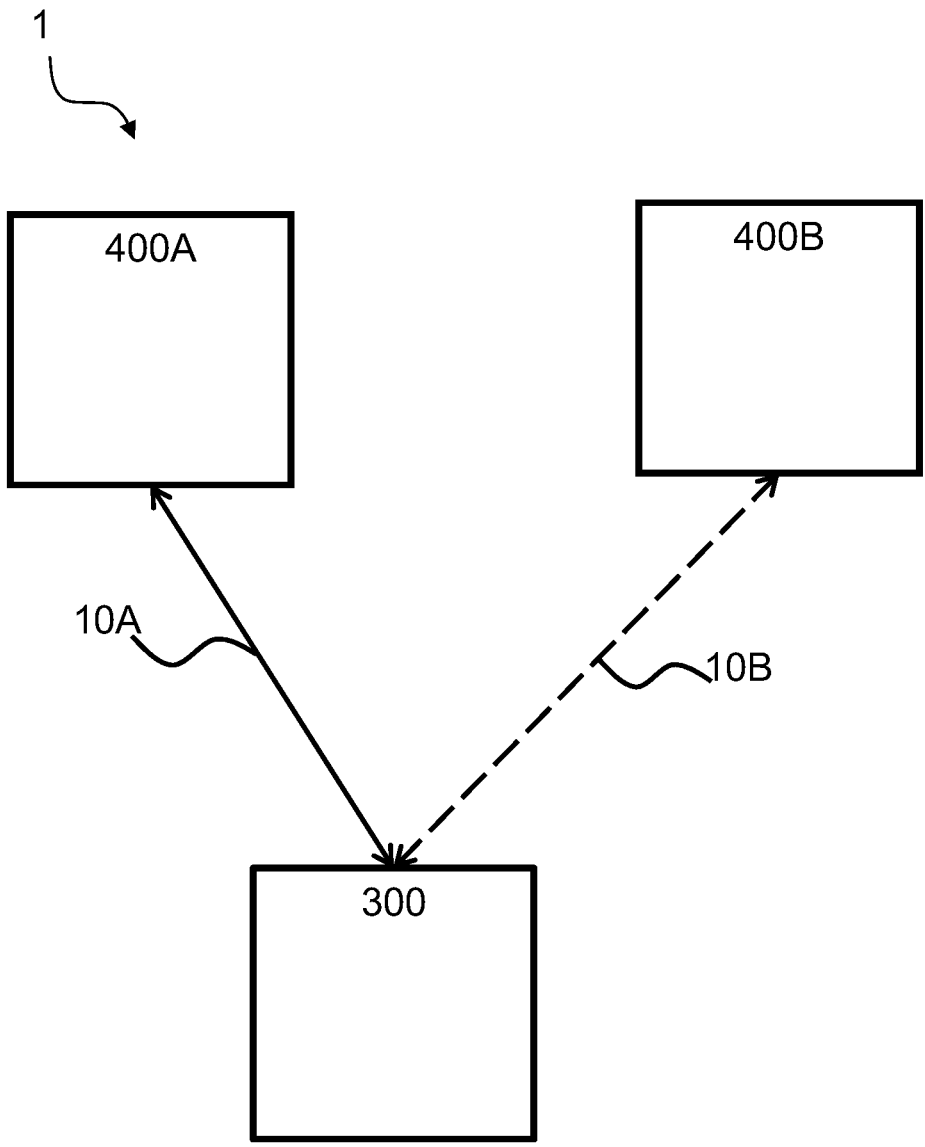
FIG. 1 is a diagram illustrating an example wireless communication system comprising an example wireless nodes and an example wireless device according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example network node 400 and an example wireless device 300 according to this disclosure.

As discussed in detail herein, the present disclosure relates to a wireless communication system 1 comprising a cellular system, for example, a 3GPP wireless communication system for mmWave operation. The wireless communication system 1 comprises one or more wireless device(s) 300, and one or more wireless nodes, such as a first wireless node 400A and a second wireless node 400B.

A wireless node as disclosed herein, refers to a radio access network node operating in the radio access network, such as a base station, an evolved Node B, eNB, gNB or to a second wireless device operating in the radio access network.

The wireless communication system 1 described herein may comprise one or more wireless devices 300, 300A, and/or one or more network nodes 400, such as one or more of: a base station, an eNB, a gNB and/or an access point.

A wireless device may refer to a mobile device and/or a user equipment, UE.

The wireless device 300 may be configured to communicate with the one or more wireless nodes, such as the first wireless node 400A and the second wireless node 400B via a wireless link (or radio access link) 10A, 10B. The wireless device 300 may communicate with the first and the second wireless nodes 400A, 400B via the corresponding wireless links 10A, 10B using parallel data streams. The parallel data streams may be data streams transmitted simultaneously from one or more wireless nodes and/or wireless devices, e.g. simultaneously over the same time period, e.g. simultaneously over the same time slot. The parallel data streams may carry independent data (e.g. by spatial multiplexing), or carry dependent data (e.g. for spatial diversity). The parallel data streams may have the same UL/DL pattern, such as the same duty cycle.

Figure 2:
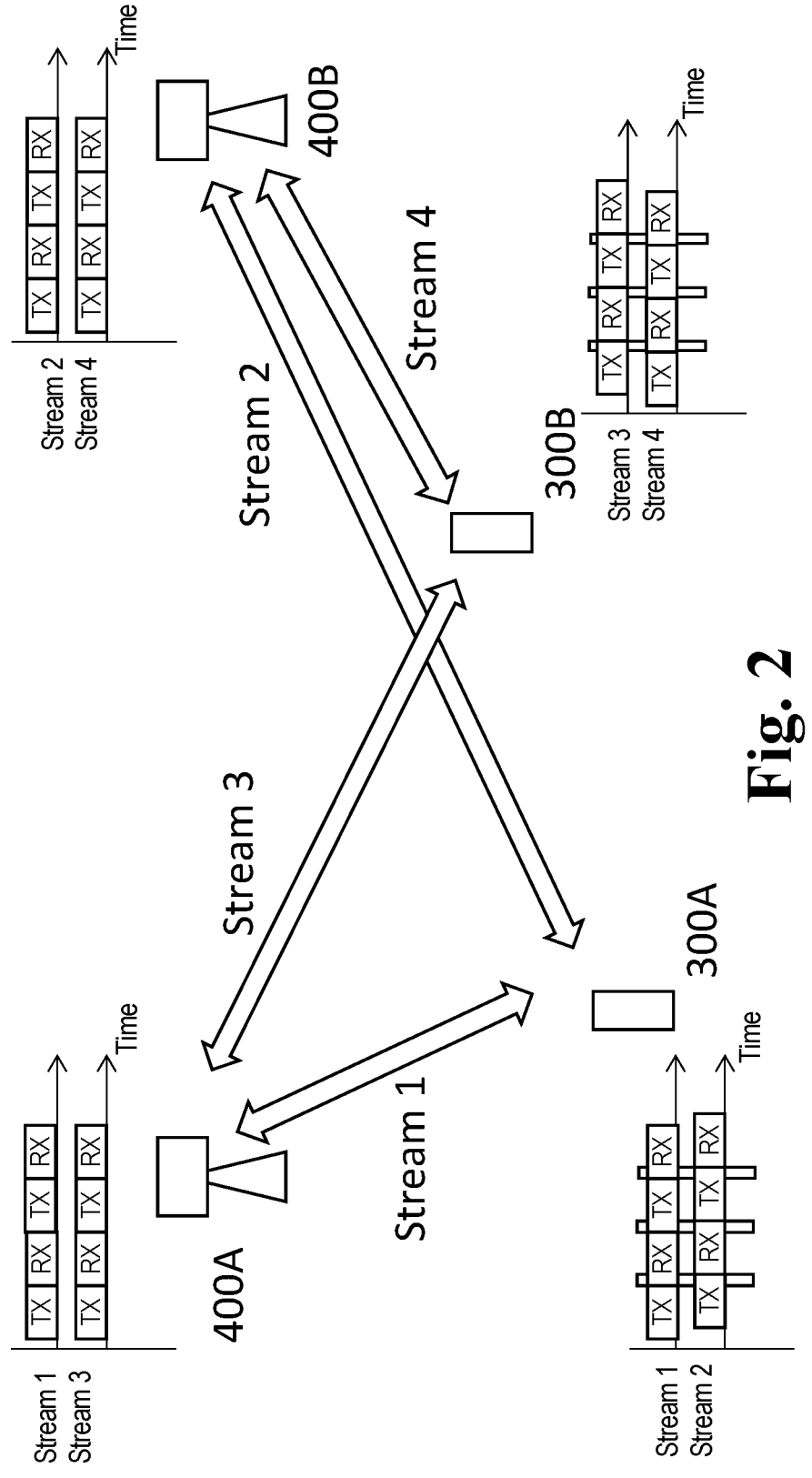
FIG. 2 is a diagram illustrating an example scenario in which a wireless device communicates with one or more wireless nodes using parallel data streams.

FIG. 2 illustrates an example scenario in which a wireless device communicates with one or more wireless nodes using parallel data streams. In this example scenario, the wireless communications system comprises a first wireless device 300A, a second wireless device 300B, a first wireless node 400A and a second wireless node 400B. Each of the wireless devices 300A and 300B, communicate with the first wireless node 400A and the second wireless node 400B using parallel data streams. The first wireless device communicates with the first wireless node using a first data stream, illustrated as Stream 1 in FIG. 2, and with the second wireless node using a second data stream, illustrated as Stream 2 in FIG. 2. The second wireless device communicates with the first wireless node using a third data stream, illustrated as Stream 3 in FIG. 2, and with the second wireless node using a fourth data stream, illustrated as Stream 4 in FIG. 2.

For operation in millimeter wave frequency range, which may also be referred to as FR2 operation, TDD may be used. In TDD operation, UL and DL transmissions are separated in time, such as being transmitted in different time slots, in the same frequency band. Precision in timing is therefore required in order to allow for successful communication. In a multi-user communication system, this requires precision in synchronization of the connected devices, such as the first wireless node 400A, the second wireless node 400B, the first wireless device 300A and the second wireless device 300B. The synchronization is used to ensure that a wireless node, such as the first wireless node 400A or the second wireless node 400B, does not have to operate in full duplex.

Each wireless node, such as the first wireless node 400A and the second wireless node 400B, may configure the wireless devices, such as the first wireless device 300A and the second wireless device 300B, with a timing advance (TA) setting, to ensure that UL and DL transmissions are synchronized at the wireless node, independent of the position of the wireless devices. The TA setting may indicate a transmit pattern for transmitting in the uplink, such as time slots for transmitting in the UL. The TA setting may be specific for each wireless device and may be based on their location relative to the wireless node. The TA setting may indicate how the timing of the transmission from each wireless device is to be adjusted in order to ensure that UL transmissions from a plurality of wireless devices are synchronized at the wireless node, such that the transmissions are received simultaneously at the wireless node independent of the location of each wireless device in relation to the wireless node. When a wireless device communicates with more than one wireless nodes using parallel data streams, the position of the wireless device in relation to the wireless nodes may result in different time of arrival (ToA), as seen by the wireless device, for transmissions from the different wireless nodes. A reason for this may be that the propagation time for a transmission from a first wireless node located further away from the wireless device than a second wireless node will be longer than the propagation time for a transmission from the second wireless node. This may result in the parallel data streams received from the wireless nodes being out of order (OoO) as seen from the wireless device. The parallel data streams being out of order herein means that transmission and/or reception on the parallel streams are not synchronized, such as when a transmission on a first data stream of the plurality of data streams occurs simultaneously, such as in a same symbol, as a reception on a second data stream of the parallel data streams. The parallel data streams may only be synchronized when the wireless device is located at the same distance to both wireless nodes.

An example of the parallel data streams being out of order, may be seen for the first wireless device 300A in FIG. 2. As can be seen in FIG. 2, the first wireless device 300A is located closer to the first wireless node 400A than the second wireless node 400B. Hence, the propagation time of Stream 2 from the second wireless node 400B to the first wireless device 300A is longer than the propagation time of Stream 1 from the first wireless node 400A, and a transmission from the second wireless node 400B on Stream 2 thus arrives later to the first wireless device 300A than a transmission from the first wireless node 400A on the Stream 1. Hence, there is an overlap in time between a transmission on Stream 2 and a reception on Stream 1, causing the two parallel data streams to be out of order, which may negatively affect the communication between the first wireless device 300A and the first and second wireless nodes 400A, 400B.

A common approach to design wireless communications systems for handling timing issues transmissions using parallel data streams is to implement generalized guard slots to avoid OoO operation at the wireless devices. Such generalized guard slots may be scheduled to be required between each transition between receive and transmit mode of a stream and may thus occupies resources at each transition between receive and transmit mode at the wireless device. Such a solution may thus waste available resources in the wireless communication system.

Wireless devices, such as UEs, will have different hardware dependent capabilities to handle timing issues in multi TRP and/or multi stream operation. Embodiments herein propose (dynamic) signaling of capabilities.

To mitigate the waste of resources caused by generalized blanking, embodiments herein therefore provide one or more solutions for handling multiple transmission links, such as parallel data streams, which are out-of-order (OoO), such as where parallel transmissions from one or more wireless nodes are not time synchronized as seen from the wireless device and in particular when receive and transmit phases of the parallel transmissions may overlap in time. In one or more of the embodiments disclosed herein, a capability signaling between a wireless device and the wireless communications network is provided. The wireless device may signal its capability of TDD operation to the wireless communications system, such as to a wireless node in the wireless communications network, in order for the wireless communications system to optimize a configuration for transmissions between the one or more wireless nodes and the wireless device.

The signaled capability of TDD operation may comprise a blanking required for the wireless device, to ensure communication using parallel data streams under current conditions. Blanking may be seen as a guard period used to ensure synchronization of the reception and/or transmission of the parallel data streams at a particular node, such as at the wireless device. In other words, blanking may be seen as a guard period ensuring that there is no overlap between reception and transmission, or transmission and reception, between the parallel data streams, as seen at a particular node, such as at the wireless device. Blanking may be applied to transmissions in UL and/or in DL. For example, the guard period may provide a time period during which no transmission is scheduled for one or more of the streams, in order to allow synchronization. The blanking required may be dependent on current conditions of the wireless device, such as radio conditions and/or hardware conditions of the wireless device, and may thus be specific for each wireless device. The hardware conditions may relate to acceptable level of cross-talk between different physical modules, or other behaviors of hardware components of the wireless device, such as physical modules where each data stream is received on a different physical module, such as multiple antenna panels of the wireless device. Cross-talk herein is a phenomenon by which a signal transmitted on one circuit or channel, such as a data stream, of a transmission system creates an undesired effect in another circuit or channel. Crosstalk is usually caused by undesired capacitive, inductive, or conductive coupling from one circuit or channel to another.

As mentioned, the need for and the amount of blanking required may be specific to each wireless device. Some wireless devices may, e.g. depending on their relative position in relation to the wireless nodes, not require blanking at all. This may e.g. be the case when the wireless device supports full duplex or when the wireless device is arranged at an equal distance from a first wireless node related to the first data stream and a second wireless node related to the second data stream, such that the transmissions on the first and second data streams are received simultaneously at the wireless device.

Furthermore, some wireless devices may support full duplex under certain radio conditions, e.g. when the wireless device receives the signals from the wireless nodes on different physical modules or when a ratio between received and transmitted power is less than a threshold, such as a power threshold. This may be seen as the wireless device supporting conditional OoO transmission. Full-duplex operation in TDD mode may only be possible for the wireless device under certain radio conditions, such as when signals transmitted on the parallel data streams, such as signals transmitted from e.g. two wireless nodes, are separated in a direction of incidence (herein also referred to as an angle of arrival), in polarization mode, and/or in signal strength. As the wireless device moves, translates, rotates and/or interacts with the environment, channel conditions for the wireless device may vary. For example, every time a wireless node is added or removed from a set of wireless nodes communicating with the wireless device, which may also be referred to as a set of serving wireless nodes, channel conditions may be re-evaluated by the wireless device. The signal strength of the data streams may be influenced by the wireless node, such as by a gNB, by balancing data rates of the data streams. In general, higher data rates require larger signal strengths.

Some wireless devices may be capable to handle small time differences on the two data streams, even though the wireless devices do not support full duplex. When the time difference is larger than the time difference that the wireless device can handle, the wireless device may signal to the network, such as to the wireless node, that the wireless device requires blanking.

The wireless device may determine the required blanking specific for the wireless device under current conditions dynamically. Dynamically determining the required blanking under current conditions may be seen as taking changes of the conditions into account when determining the required blanking for the wireless device. This may e.g., be performed by monitoring the radio conditions, such as the power level of each of the parallel data streams, the angle of arrival of each of the parallel data streams and/or the delay of the streams and may determine the blanking required for the current radio conditions. For example, by dynamically signaling the required blanking for the wireless device under current conditions, the amount of blanking for the wireless device may be adapted to the time-varying channel conditions. Thereby, a better usage of available network resources is provided, which may lead to a reduced latency of transmissions in the parallel data streams and an increased capacity of the network.

The required blanking may e.g., be determined by measuring a time of arrival, such as a ToA at the wireless device, of the signals from the one or more wireless nodes and computing a difference of the time of arrival of the signals. The difference of the time of arrival between the signals received, such as received by the wireless device, from the one or more wireless nodes may relate to an overlap of e.g., a transmission in the first data stream and a reception in the second data stream of the parallel data streams or vice versa, and thereby a level of OoO. The level of OoO may relate to a required level of blanking for the wireless device.

Determining the required blanking based on ToA has the benefit that the wireless device can determine the required blanking prior to connecting, such as enter RRC connected state, to two or more wireless nodes while being in idle mode, such as in RRC Idle State. The wireless terminal can obtain, such as autonomously obtain, such as measure the ToA in idle mode, such as RRC Idle State, for example by monitoring Synchronisation Signal (SS)/Physical Broadcast Channel (PBCH) Physical Layer (PHY) signals from a plurality of wireless nodes, or by monitoring DL positioning reference signals (PRS) from the plurality of wireless nodes, and/or a combination of the two. Thus, while the wireless device is in idle mode, the wireless device may determine, such as compute, a required blanking should the wireless terminal enter communication with two or more of the plurality of wireless nodes whose ToA has been obtained, such as measured, by the wireless device. This has the advantage that the wireless node may determine the required blanking by detecting a respective signal from the plurality of wireless nodes without having to decode the respective signals.

TA however, is typically computed by network nodes based on a Physical Random Access Channel (PRACH) preamble transmissions from a wireless terminal, and then fed-back to the wireless terminal initially through Radio Access (RA) message 2, and subsequently through TA commands. Thus, TA requires the wireless device to be connected to a plurality of wireless nodes, and/or having started an initial access procedure to connect to the plurality of wireless nodes, before a required blanking can be determined by the wireless device based on TA.

By determining the required blanking based on the ToA, blanking information, such as information indicative of the required blanking, can be sent to the network prior to the wireless device connecting to two or more wireless nodes, such as when the wireless device is in the connected state to only one wireless node.

If e.g., a single wireless node, such as single TRP, is transmitting two parallel data streams, it is also possible to have different time of arrival on the two data streams. For example, for inter band Carrier Aggregation, CA, operation, one data stream may be transmitted using a first frequency band, and the other data stream may be transmitted on a second frequency band. The two transmitters for the parallel data streams may e.g. be unsynchronized, such as being operated by different operators, operating in frequencies with different numerologies, or belonging to different systems (such as Wi-Fi and NR), which may lead to different time of arrival of the first and second parallel data streams. Since the propagation channel can be different on the two frequency bands, the times of arrival of the two data streams may be different.

To adapt the blanking to a specific wireless device, the wireless device may signal, to the wireless communications network, such as to one or more wireless nodes, the amount of blanking it requires. If both parallel data streams are related to a single wireless node, such as when the communication over both parallel data streams are between the wireless device and a single wireless node, the wireless device may signal the blanking required to the single wireless node. When the parallel data streams are related to different wireless nodes, such as to a first and a second wireless node and the wireless nodes are communicating with each other, the wireless device may signal the blanking information to a first of the one or more wireless nodes. The first wireless node may then forward the blanking information to the second wireless node. If the wireless nodes are not communicating with each other, such as e.g. when the wireless nodes are connected to different gNBs or the communication between the wireless nodes for other reasons is limited, the wireless device may signal the blanking to either one of the wireless nodes (such as to the wireless node related to a data stream to which blanking is to be added) or to both wireless nodes, where the blanking may be shared between the parallel data streams.

The wireless communications system, such as one or more of the wireless nodes may, based on the signaled required blanking for the wireless device, configure the wireless device with an individually configured blanking slot. The individually configured blanking slot may be configured based on the current conditions, such as e.g. radio conditions or channel conditions, experienced by the wireless device. Each wireless device in the communications network may thus be configured with individual blanking slots based on their required blanking.

The signaling of the capability of TDD operation, may comprise indicating to one or more wireless nodes whether the wireless device supports OoO transmissions, whether it supports conditional OoO transmission, or whether it does not support OoO transmissions. When the wireless device supports OoO operation, such as when the wireless device supports full duplex operation, the wireless device may indicate to the one or more wireless nodes that no blanking is required. When the wireless device signals that no blanking is required, the wireless node may schedule transmissions to and/or from the wireless device without scheduling blanking.

FIG. 3 shows a flow diagram of an example method 100, performed at a wireless device, for communicating with one or more wireless nodes using parallel data streams, according to the disclosure.

The method 100 comprises determining S101, based on a first time of arrival of a first signal from a first wireless node and a second time of arrival of a second signal from a second wireless node, blanking required by the wireless device to ensure communication using the parallel data streams under current conditions. The blanking required by the wireless device may in one or more example methods be determined based on a difference in time of arrival of the first signal received from the first wireless node and the second signal received from the second wireless node.

The method 100 comprises transmitting S103, to at least one of the first and second wireless nodes, signaling indicative of the determined required blanking. The signaling indicative of the determined required blanking may be different for different wireless nodes.

The first signal from the first wireless node may be indicative of a first data stream of the parallel data streams and the second signal from the second wireless node may be indicative of a second data stream of the parallel data streams.

In one or more example methods, the blanking may provide a time gap required to enable transmission and reception of the parallel data streams at the wireless device. For example, the signaling indicative of the required blanking may indicate a required time gap, such as a minimum time gap needed to enable transmission and reception of the parallel data streams at the wireless device. Blanking may herein refer to a guard period, during which no transmission is scheduled for one or more of the streams, in order to ensure that there is no overlap between reception and transmission, or transmission and reception, between the parallel data streams, as seen at a particular node, such as at the wireless device.

In one or more example methods, the determined blanking required allows half-duplex communication at the wireless device using the parallel data streams. During half-duplex communication transmission and reception are separated in time. When there is no overlap between transmission and reception of the parallel data streams, such as when the parallel data streams are synchronized in time, such as when blanking has been applied, the wireless device can use half-duplex communication for communicating over the parallel data streams.

In one or more example methods, the blanking required is determined based on a capability of the wireless device. The capability of the wireless device may comprise a capability associated with support of full duplex. In some example implementations, the wireless device may support full duplex operation, allowing the wireless device to handle out of order transmissions. When the wireless device supports full duplex operation under the current conditions, blanking may not be required for the wireless device. The wireless device may thus signal to one or more of the wireless nodes that no blanking is required.

In one or more example methods, the blanking required is determined based on radio conditions of the wireless device. The radio conditions may be one or more of a power level, such as a power level of each of the parallel data streams, an angle of arrival of each of the parallel data streams at the wireless device and/or a delay of the parallel data streams, such as a delay of arrival of one or more of the parallel data streams. In one or more example methods, the blanking required is determined based on a first angle of arrival of the first signal from the first wireless node and a second angle of arrival of the second signal from the second wireless node. The first signal may be transmitted and/or received on different modules of the wireless node and/or the wireless device. The position of each module may influence the angle of arrival of the signal at the wireless device. The angle of arrival may be associated with transmission and/or reception of the parallel streams on different modules of the wireless node and/or the wireless device. In one or more example methods, the blanking required is determined based on a difference in power level between received and transmitted signals of the parallel streams.

The blanking required for the wireless device may be determined dynamically. For example, the wireless device may monitor the radio conditions, such as the signal-to-noise ratio, the power level of each of the parallel data streams, the angle of arrival of each of the parallel data streams and/or the delay of the streams and may determine the blanking required for the current radio conditions.

In some exemplary methods, the wireless device may dynamically signal its required blanking (for example, transmit signalling indicative of the required blanking). The required blanking may be dynamically determined based on the radio conditions and/or the wireless device's capability associated with support of full duplex communication. In some example embodiments, the wireless device may signal a change of the required blanking upon determining that the required blanking has changed, e.g. based on changing radio conditions. By dynamically determining and signaling the required blanking of the wireless device to wireless nodes, time-varying radio conditions may be tracked and the blanking for the wireless device may be adapted to the current radio conditions for the wireless device.

In one or more example methods, the blanking, such as the time gap required to enable transmission and reception of the parallel data streams at the wireless device, may be determined to be zero under certain conditions, such as when the wireless device supports full duplex and/or may transmit and receive parallel data streams simultaneously. The signaling indicative of the determined required blanking may e.g. indicate that the wireless device supports full duplex or may indicate that the required blanking is zero.

When the wireless device does not support full duplex, the blanking required may indicate a minimum time gap required to avoid OoO transmission, such as avoiding overlapping transmissions and receptions at the wireless device. The blanking required to avoid OoO transmission may correspond to the overlap of a transmission and a reception of the parallel data streams.

In some example methods, the wireless device may have a capability to handle OoO transmissions up to a difference in time of arrival between the parallel data streams, such as when the difference in time of arrival is less than an out of order threshold, such as less than a certain number of symbols, such as e.g. one symbol, even though the wireless device does not support full duplex operation. The wireless device may thus determine that no blanking is required when the difference in time of arrival is below the out of order threshold.

In one or more example methods, the signaling indicative of the determined required blanking comprises signaling indicating a data stream out of the parallel data streams that requires blanking. The wireless device may e.g. determine the blanking required individually for each of the parallel data streams. The blanking required may be different for each of the parallel data streams. In some embodiments, blanking may only be required for one of the parallel data streams, but not for another. The wireless device may thus indicate the data stream out of the parallel data streams that requires blanking. In case both parallel data streams require blanking, the signaling indicative of the determined required blanking may comprise signaling indicative of a required blanking required for each individual data stream.

In one or more example methods, determining S101 the blanking required comprises determining S101A a blanking parameter. The blanking parameter may comprise one or more of a time gap, such as a difference between the first time of arrival and the second time of arrival, and a blanking level. The blanking level may e.g. comprise a number of symbols required for blanking under current conditions. The number of symbols required for the blanking may e.g. be determined based on the required time gap for blanking and a symbol duration. The wireless device may e.g. determine the time gap required for the blanking based on the difference between the first time of arrival of a transmission in the first data stream and the second time of arrival of a transmission in the second stream. The wireless device may then determine the number of symbols required for blanking by determining a minimum number of symbols required to cover the determined time gap. If for example the time gap is larger than the duration of one symbol but smaller than the duration of two symbols, the wireless device may determine that the blanking level is two symbols, in order to ensure that there is no overlap between a transmission and a reception of the parallel data streams. In some example methods, the blanking level may comprise predetermined amounts of blanking, such as for example a large, medium or small amount of blanking. Each predetermined amount of blanking may correspond to a predetermined number of symbols for blanking, wherein the large amount of blanking corresponds to a higher number of symbols than the medium amount of blanking and the medium amount of blanking corresponds to a higher number of symbols than the small amount of blanking. The predetermined amounts of blanking may be known to the wireless nodes, such as by being preconfigured in the wireless nodes, and the required blanking may thus be determined by the wireless nodes based on the amount of blanking indicated by the blanking level signaled by the wireless device.

In one or more example methods, the wireless device may be configured to switch the blanking on and/or off. The wireless device may e.g. be configured to delay transmission, at the wireless device's own volition, by a predetermined number of symbols, such as by x symbols, to avoid operating in full duplex. The wireless device may e.g. receive control signalling from the wireless node indicating a maximum number of symbols that the wireless device may use for delaying the transmission in the UL. The wireless device may decide to delay the transmission by a number of symbols equal to or smaller than the indicated maximum number of symbols, such as e.g. by the required blanking. This may be done without the wireless device requesting blanking from the wireless node.

In one or more example methods, the signaling indicative of the determined required blanking comprises control signaling indicative of the determined required blanking. The control signaling indicative of the determined required blanking may e.g. comprise the determined blanking parameter. The required blanking may thus be explicitly signaled to the one or more wireless nodes, in e.g. a control plane.

In one or more example methods, transmitting S103, to one of the first and second wireless nodes, the signaling indicative of the blanking required comprises transmitting S103B, to one of the first and second wireless nodes, data according to the determined required blanking.

In one or more example methods, the signaling indicative of the determined required blanking comprises a blanking request. In one or more example methods, the signaling indicative of the determined required blanking comprises signaling indicating whether blanking is required for uplink and/or downlink transmission. The wireless device may thus signal a request for blanking on either a transition from Rx to Tx or a transition from Tx to Rx. Blanking in uplink may correspond to the wireless device waiting with uplink transmission on a first data stream of the parallel data streams until the wireless device has finished receiving on a second data stream of the parallel data streams. Blanking in downlink may correspond to the wireless node avoiding using one or more downlink symbol(s) for transmission to the wireless device on a first data stream, to ensure that the wireless device has finished transmitting on a second data stream of the parallel data streams. The wireless device may be able to handle a certain amount of cross-talk between two parallel streams, the amount of cross-talk being related to a hardware implementation of the wireless device. When the wireless device supports OoO operation based on low transmit/ receive power ratio, associated with only one of the parallel data streams, for example when the cross-talk between the parallel streams is below the amount that the wireless device can handle, blanking may only be required on either transitions from receiving to transmitting or transitions from transmitting to receiving. An example scenario of when blanking is only required on one type of transitions may be when the wireless device communicates with multiple wireless nodes, such as with a first wireless node using a first stream and with a second wireless node using a second stream, and the first wireless node is nearby and the second wireless node is further away. If the UE transmits towards the first nearby wireless node, the transmission power level of the wireless device may be low, and the wireless device may operate in full duplex without requiring blanking. On the other hand, if the wireless device transmits towards the second wireless device located further away from the wireless device, the wireless device has to transmit with a much higher transmission power due to the higher pathloss. In such a case, the wireless device will not be able to operate in full duplex and may require blanking.

In some example methods, the blanking required may be implemented in either UL or DL. In some example methods, it may be preconfigured that the blanking for a data stream is to be applied to either uplink or downlink transmissions. It may e.g. be preconfigured that the blanking is applied to the downlink transmission and that the wireless node thus is to wait with the downlink transmission to the wireless device for the determined blanking period. The wireless device may thus expect not to be scheduled for overlapping transmissions when it has signaled out of order capability, such as a required blanking.

FIG. 4 shows a flow diagram of an example method 200 of operating a wireless node for enabling the wireless device to communicate with one or more wireless nodes using parallel data streams according to the disclosure. The wireless node may e.g. be a network node or another wireless device. The method 200 comprises obtaining S201 signaling indicative of a blanking required by the wireless device to ensure communication using the parallel data streams under current conditions. The method 200 comprises controlling S203, based on the obtained signaling indicative of the blanking required, a data stream communication to the wireless device, such as a downlink data stream transmission to the wireless device. In other words, the wireless node may change its transmission of the data stream, such as the downlink data stream, based on the obtained signaling indicative of the blanking required, such as based on the blanking required.

In one or more example methods, the blanking required provides a time gap, such as a time gap between a period of reception and a period of transmission, required to enable transmission and reception of the parallel data streams at the wireless device.

In one or more example methods, the obtained signaling indicative of the blanking required comprises signaling indicating a data stream out of the parallel data streams that requires blanking. The signaling indicative of the blanking required may comprise an identifier, such as a data stream identifier, indicative of the data stream. In case both parallel data streams require blanking, the signaling indicative of the required blanking may comprise signaling indicating the required blanking for each individual data stream. In one or more example methods, the data stream identifier may be signaled with a corresponding blanking required for the data stream relating to the data stream identifier. In one or more example embodiments, the signaling indicative of the blanking required may comprise signaling indicative of one or more data streams of the parallel data streams that require blanking and the amount of blanking required for each of the data streams being indicated as requiring blanking.

In one or more example methods, the obtained signaling indicative of the blanking required comprises signaling indicating whether blanking is required for uplink and/or downlink transmission.

In one or more example methods, obtaining S201 the signaling indicative of the blanking required by the wireless device comprises receiving S201A, from the wireless device or from another wireless node, the signaling indicative of the blanking required by the wireless device.

In one or more example methods, obtaining S201 signaling indicative of the blanking required comprises receiving S201B, from the wireless device, data according to the blanking required. In one or more example methods, the method comprises determining S202 the blanking required based on a time of reception of the data from the wireless device. If the time of reception of the data from the wireless device is later than what has been scheduled for the wireless device by the wireless node, the wireless node may determine that the blanking required corresponds to the delay in the time of reception of the data from the wireless device. The delay in the time of reception of the data may correspond to the time difference between a time of the scheduled resources for receiving the data transmission from the wireless device and the actual arrival time of the data from the wireless device. The delay in the time of reception of the data may thus indirectly signal to the wireless node that the wireless device has applied blanking to the uplink transmission. Thereby, the blanking required for the wireless device may be signaled to the wireless node without additional control signaling, which increases the capacity in the communications network.

In one or more example methods, controlling S203 the data stream communication to the wireless device comprises scheduling 5203A the data stream communication to the wireless device, such as a downlink data stream transmission, according to the blanking required. Scheduling the data stream communication to the wireless device according to the blanking required may comprise communicating the data stream between the wireless node and the wireless device according to the blanking required. The wireless node may e.g. postpone a transmission to the wireless device based on the obtained required blanking for a first data stream of the parallel data streams, such that the wireless device may finish transmitting on a second data stream of the parallel data streams before it receives on the first stream.

In one or more example methods, controlling S203 the data stream communication to the wireless device comprises configuring 5203B the wireless device with one or more blanking slots for the data stream communication to the wireless device. Configuring 5203B the wireless device with one or more blanking slots may e.g. comprise indicating the number of slots to be used by the wireless device for blanking. The indication of the number of slots for blanking may e.g. be signaled to the wireless device using control signaling indicative of the number of slots. In other words, the blanking required may be seen as wireless device specific, such as UE specific, rather than a system parameter that can be broadcasted.

In one or more example methods, the wireless node may signal, such as by control signalling, to the wireless device, that the wireless device is allowed to delay transmissions in the UL at the wireless device's own volition. The signalling may indicate to the wireless device that a delay of transmissions is allowed, and that the symbols used for delaying the transmissions are free and not allocated to another wireless device. The signalling may comprise an indication of a number of symbols, such as a maximum number of symbols, that the wireless device may use for delaying the transmissions.

In one or more example methods, the obtained signaling indicative of the blanking required comprises control signaling indicative of the blanking required. In one or more example methods, the control signaling comprises a blanking parameter. The blanking parameter may comprise one or more of: a difference between the first time of arrival and the second time of arrival, which may also be seen as a time gap, and a blanking level.

In one or more example methods, the wireless node is a first wireless node of the plurality of wireless nodes communicating with the wireless device, and the method 200 comprises transmitting S205 signaling indicative of the blanking required by the wireless device to a second wireless node of the plurality of wireless nodes communicating with the wireless device. In order to reduce the amount of signaling, the wireless device may signal the required blanking for one or more of the parallel data streams to a first of the wireless nodes communicating with the wireless device via a first of the parallel data streams, such as e.g. to a first gNB. If the signaling indicative of the required blanking comprises an indication that blanking is required for a data stream not related to the first wireless node, such as for a second data stream of the parallel data streams related to a second wireless node, the first wireless node may forward the signaling indicative of the required blanking for the second data stream to the second wireless node, such as e.g. to a second gNB. The signaling indicative of the required blanking may be transmitted to the second wireless node of the plurality of wireless nodes using control signaling. When the first and second wireless nodes are radio network nodes, such as eNBs or gNBs the control signaling indicative of the blanking required by the wireless device may be transmitted to the second wireless node via an Xn interface.

Figure 5:
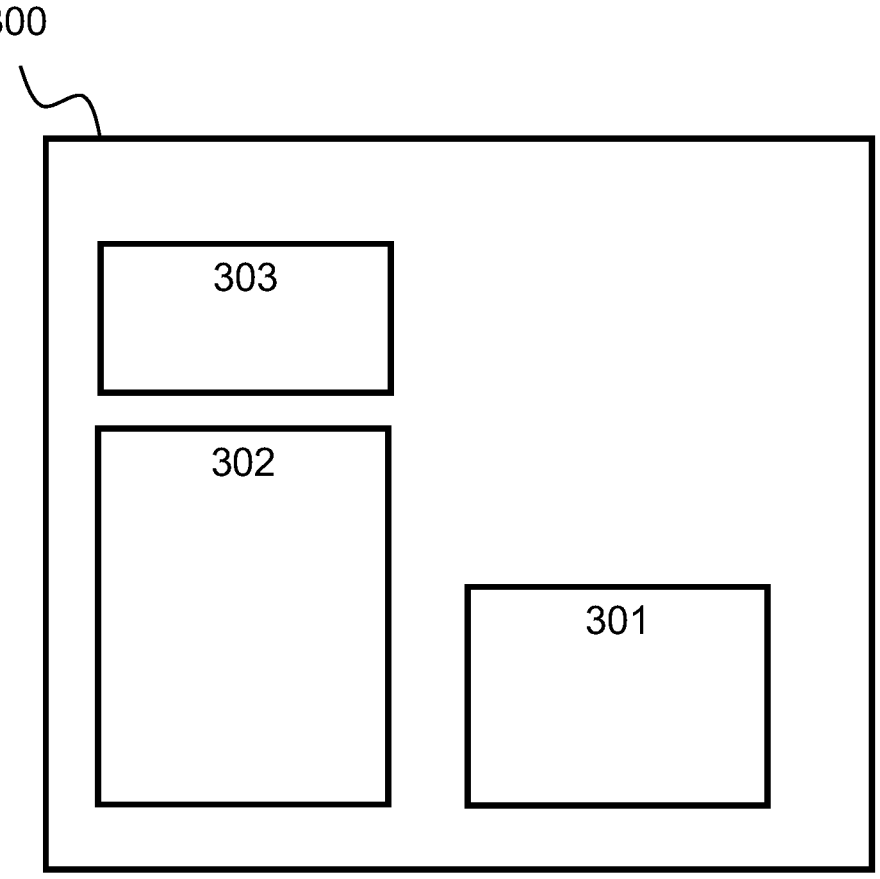
FIG. 5 is a block diagram illustrating an example wireless device according to this disclosure.

FIG. 5 shows a block diagram of an example wireless device 300 according to the disclosure. The wireless device 300 comprises memory circuitry 301, processor circuitry 302, and a wireless interface 303. The wireless device 300 may be configured to perform any of the methods disclosed in FIG. 3. In other words, the wireless device 300 may be configured for communicating with one or more wireless nodes using parallel data streams.

The wireless device 300 is configured to communicate with a wireless node, such as the wireless node 400 disclosed herein, using a wireless communication system.

The wireless device 300 is configured to determine (such as via the processor circuitry 302), based on a first time of arrival of a first signal from a first wireless node and a second time of arrival of a second signal from a second wireless node, blanking required by the wireless device to ensure communication using the parallel data streams under current conditions.

The wireless device 300 is configured to transmit (such as via the wireless interface 303), to at least one of the first and second wireless nodes, signaling indicative of the determined required blanking.

The wireless interface 303 is configured for wireless communications via a wireless communication system, such as a 3GPP system, such as a 3GPP system supporting one or more of: New Radio, NR, Narrow-band IoT, NB-IoT, Long Term Evolution-enhanced Machine Type Communication, LTE-M, Wi-Fi and millimeter-wave communications, such as millimeter-wave communications in licensed and unlicensed bands, such as device-to-device millimeter-wave communications in licensed and unlicensed bands.

The wireless device 300 is optionally configured to perform any of the operations disclosed in FIG. 3 (such as any one or more of S101A, S103A). The operations of the wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless device 300 may be considered a method that the wireless device 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 5). Memory circuitry 301 is considered a non-transitory computer readable medium.

Memory circuitry 301 may be configured to store information (such as information indicative of the blanking required) in a part of the memory.

Figure 6:
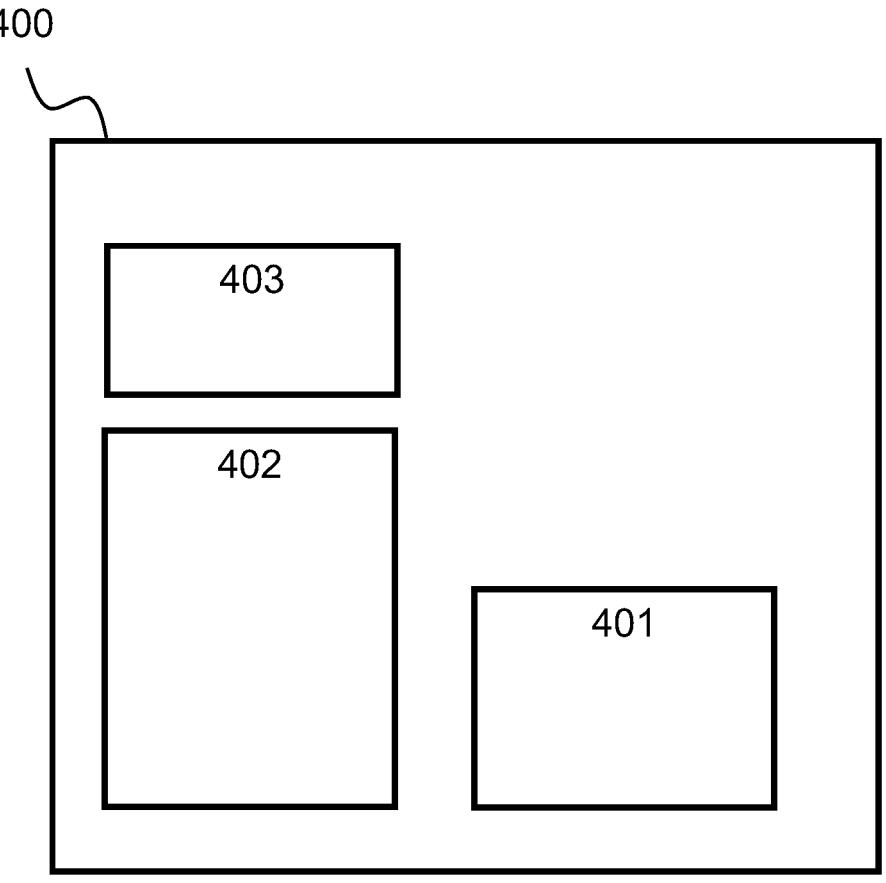
FIG. 6 is a block diagram illustrating an example wireless node according to this disclosure.

FIG. 6 shows a block diagram of an example wireless node 400 according to the disclosure. The wireless node 400 comprises memory circuitry 401, processor circuitry 402, and a wireless interface 403. The wireless node 400 may be configured to perform any of the methods disclosed in FIG. 4. In other words, the wireless node 400 may be configured for enabling a wireless device to communicate with one or more wireless nodes using parallel data streams.

The wireless node 400 is configured to communicate with a wireless device, such as the wireless device 300 disclosed herein, using a wireless communication system.

The wireless interface 403 is configured for wireless communications via a wireless communication system, such as a 3GPP system, such as a 3GPP system supporting or more of: New Radio, NR, Narrow-band IoT, NB-IoT, Long Term Evolution-enhanced Machine Type Communication, LTE-M, Wi-Fi and millimeter-wave communications, such as millimeter-wave communications in licensed and/or unlicensed bands, such as device-to-device millimeter-wave communications in licensed and/or unlicensed bands.

The wireless node 400 is configured to obtain signaling indicative of a blanking required by the wireless device to ensure communication using the parallel data streams under current conditions.

The wireless node 400 is configured to control, based on the obtained signaling indicative of the blanking required, a data stream communication to the wireless device.

Processor circuitry 402 is optionally configured to perform any of the operations disclosed in FIG. 4 (such as any one or more of S201A, S201B, S202, S203A, S203B, S205). The operations of the wireless node 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the wireless node 400 may be considered a method that the wireless node 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 6). Memory circuitry 401 is considered a non-transitory computer readable medium.

Memory circuitry 401 may be configured to store information (such as information indicative of the blanking required and/or capabilities of the wireless device) in a part of the memory.

Embodiments of methods and products (wireless node and wireless device) according to the disclosure are set out in the following items:

Item 1. A method, performed at a wireless device, for communicating with one or more wireless nodes using parallel data streams, the method comprising:

determining (S101), based on a first time of arrival of a first signal from a first wireless node and a second time of arrival of a second signal from a second wireless node, blanking required by the wireless device to ensure communication using the parallel data streams under current conditions; and transmitting (S103), to at least one of the first and second wireless nodes, signaling indicative of the determined required blanking.

Item 2. The method according to Item 1, wherein the blanking provides a time gap required to enable transmission and reception of the parallel data streams at the wireless device.

Item 3. The method according to Item 1 or 2, wherein the blanking required is determined based on a capability of the wireless device, wherein the capability of the wireless device comprises a capability associated with support of full duplex.

Item 4. The method according to Item 3, wherein the blanking required is determined based on radio conditions of the wireless device.

Item 5. The method according to any one of the previous Items, wherein determining (S101) the blanking required comprises determining (S101A) a blanking parameter, wherein the blanking parameter comprises one or more of: a difference between the first time of arrival and the second time of arrival and a blanking level.

Item 6. The method according to any one of the previous Items, wherein the signaling indicative of the determined required blanking comprises control signaling indicative of the determined required blanking.

Item 7. The method according to Item 5 and 6, wherein the control signaling comprises the determined blanking parameter.

Item 8. The method according to any of the previous Items, wherein the blanking required is determined based on a first angle of arrival of the first signal from the first wireless node and a second angle of arrival of the second signal from the second wireless node.

Item 9. The method according to any of the previous Items, wherein the blanking required is determined based on a difference in power level between received and transmitted signals of the parallel streams.

Item 10. The method according to any one of the previous Items, wherein transmitting (S103), to one of the first and second wireless nodes, the signaling indicative of the blanking required comprises transmitting, to one of the first and second wireless nodes, data according to the determined required blanking.

Item 11. The method according to any one of the previous Items, wherein the determined blanking required allows half-duplex communication at the wireless device using the parallel data streams.

Item 12. The method according to any one of the previous Items, wherein the signaling indicative of the determined required blanking comprises signaling indicating a data stream out of the parallel data streams that requires blanking.

Item 13. The method according to any one of the previous Items, wherein the signaling indicative of the determined required blanking comprises signaling indicating whether blanking is required for uplink and/or downlink transmission.

Item 14. A method, performed at a wireless node, for enabling a wireless device to communicate with one or more wireless nodes using parallel data streams, the method comprising:

obtaining (S201) signaling indicative of a blanking required by the wireless device to ensure communication using the parallel data streams under current conditions; and controlling (S203), based on the obtained signaling indicative of the blanking required, a data stream communication to the wireless device.

Item 15. The method according to Item 14, wherein the blanking provides a time gap required to enable transmission and reception of the parallel data streams at the wireless device.

Item 16. The method according to any one of the Items 14 to 15, wherein controlling (S203) the data stream communication to the wireless device comprises scheduling (S203A) the data stream communication to the wireless device according to the blanking required.

Item 17. The method according to any one of the Items 14 to 16, wherein controlling (S203) the data stream communication to the wireless device comprises configuring (S203B) the wireless device with one or more blanking slots for the data stream communication to the wireless device.

Item 18. The method according to any one of the Items 14 to 17, wherein the signaling indicative of the blanking required comprises control signaling indicative of the blanking required.

Item 19. The method according to Item 18, wherein the control signaling comprises a blanking parameter.

Item 20. The method according to Item 19, wherein the blanking parameter comprises one or more of: a difference between the first time of arrival and the second time of arrival and a blanking level.

Item 21. The method according to any one of the previous Items 14 to 20, wherein obtaining (S201) the signaling indicative of a blanking required by the wireless device comprises receiving (S201A), from the wireless device or from another wireless node, the signaling indicative of the blanking required by the wireless device.

Item 22. The method according to any one of the previous Items 14 to 17, wherein obtaining (S201) signaling indicative of the blanking required comprises receiving (S201B), from the wireless device, data according to the blanking required.

Item 23. The method according to Item 22, wherein the method further comprises: determining (S202) the blanking required based on a time of reception of the data from the wireless device.

Item 24. The method according to any one of the previous Items 14 to 23, wherein the obtained signaling indicative of the blanking required comprises signaling indicating a data stream out of the parallel data streams that requires blanking.

Item 25. The method according to any one of the previous Items 14 to 24, wherein the obtained signaling indicative of the blanking required comprises signaling indicating whether blanking is required for uplink and/or downlink transmission.

Item 26. The method according to any one of the previous Items 14 to 25, wherein the wireless node is a first wireless node of the plurality of wireless nodes communicating with the wireless device, and wherein the method comprises:

transmitting (S205) signaling indicative of a blanking required by the wireless device to a second wireless node of the plurality of wireless nodes communicating with the wireless device.

Item 27. The method according to any one of the Items 14 to 26, wherein the wireless node is a network node or another wireless device.

Item 28. A wireless device comprising memory circuitry, processor circuitry, and a wireless interface, wherein the wireless device is configured to perform any of the methods according to any of Items 1-13.

Item 29. A wireless node comprising memory circuitry, processor circuitry, and a wireless interface, wherein the radio network node is configured to perform any of the methods according to any of Items 14-27.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-6 comprises some circuitries or operations which are illustrated with a solid line and some circuitries or operations which are illustrated with a dashed line. Circuitries or operations which are comprised in a solid line are circuitries or operations which are comprised in the broadest example embodiment. Circuitries or operations which are comprised in a dashed line are example embodiments which may be comprised in, or a part of, or are further circuitries or operations which may be taken in addition to circuitries or operations of the solid line example embodiments. It should be appreciated that these operations need not be performed in order presented.

Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed at a wireless device, for communicating with one or more wireless nodes using parallel data streams, the method comprising:

receiving a first signal from a first wireless node and a second signal from a second wireless node;

determining, based on a first time of arrival of the first signal and a second time of arrival of the second signal, blanking required by the wireless device to ensure communication between the wireless device and the one or more wireless nodes using the parallel data streams under current conditions;

communicating with at least one of the first and second wireless nodes; and transmitting, to at least one of the first and second wireless nodes, signaling indicative of the determined required blanking, wherein the current conditions are radio conditions, hardware conditions, or a combination thereof of the wireless device.

2. The method according to claim 1, wherein the blanking provides a time gap required to enable transmission and reception of the parallel data streams at the wireless device.

3. The method according to claim 1, wherein the blanking required is determined based on a capability of the wireless device, wherein the capability of the wireless device comprises a capability associated with support of full duplex.

4. The method according to claim 3, wherein the blanking required is determined based on radio conditions of the wireless device.

5. The method according to claim 1, wherein determining the blanking required comprises determining a blanking parameter, wherein the blanking parameter comprises one or more of: a difference between the first time of arrival and the second time of arrival and a blanking level.

6. The method according to claim 5, wherein the signaling indicative of the determined required blanking comprises control signaling indicative of the determined required blanking and wherein the control signaling comprises the determined blanking parameter.

7. The method according to claim 1, wherein the signaling indicative of the determined required blanking comprises control signaling indicative of the determined required blanking.

8. The method according to claim 1, wherein the blanking required is determined based on a first angle of arrival of the first signal from the first wireless node and a second angle of arrival of the second signal from the second wireless node.

9. The method according to claim 1, wherein the blanking required is determined based on a difference in power level between received and transmitted signals of the parallel streams.

10. The method according to claim 1, wherein transmitting, to one of the first and second wireless nodes, the signaling indicative of the blanking required comprises transmitting, to one of the first and second wireless nodes, data according to the determined required blanking.

11. The method according to claim 1, wherein the determined blanking required allows half-duplex communication at the wireless device using the parallel data streams.

12. The method according to claim 1, wherein the signaling indicative of the determined required blanking comprises signaling indicating a data stream out of the parallel data streams that requires blanking.

13. The method according to claim 1, wherein the signaling indicative of the determined required blanking comprises signaling indicating whether blanking is required for uplink transmission, downlink transmission, or a combination thereof.

14. A method, performed at a wireless node, for enabling a wireless device to communicate with one or more wireless nodes using parallel data streams, the method comprising:

transmitting a signal to the wireless device to determine a blanking required by the wireless device;

obtaining, from the wireless device, signaling indicative of the blanking required by the wireless device to ensure communication using the parallel data streams under current conditions; and controlling, based on the obtained signaling indicative of the blanking required, a data stream communication to the wireless device, wherein the current conditions are radio conditions, hardware conditions, or a combination thereof of the wireless device.

15. The method according to claim 14, wherein the blanking provides a time gap required to enable transmission and reception of the parallel data streams at the wireless device.

16. The method according to claim 14, wherein controlling the data stream communication to the wireless device comprises scheduling the data stream communication to the wireless device according to the blanking required.

17. The method according to claim 14, wherein controlling the data stream communication to the wireless device comprises configuring the wireless device with one or more blanking slots for the data stream communication to the wireless device.

18. The method according to claim 14, wherein the signaling indicative of the blanking required comprises control signaling indicative of the blanking required.

19. The method according to claim 18, wherein the control signaling comprises a blanking parameter.

20. The method according to claim 19, wherein the blanking parameter comprises one or more of: a difference between the first time of arrival and the second time of arrival and a blanking level.

* * * * *